United States Patent [19]

Bainard et al.

[11] 4,270,442
[45] Jun. 2, 1981

[54] DISC BRAKE BOOT

[75] Inventors: Dean R. Bainard, Bethel Township, York County, S.C.; Martin Benjamin, E. Gastonia, N.C.

[73] Assignee: Garlock Inc., Longview, Tex.

[21] Appl. No.: 109,894

[22] Filed: Jan. 7, 1980

Related U.S. Application Data

[63] Continuation of Ser. No. 875,765, Feb. 7, 1978, abandoned.

[51] Int. Cl.³ .......................... F16J 15/18; F16J 15/52
[52] U.S. Cl. ...................................... 92/168; 74/18.2; 277/212 FB; 277/DIG. 4; 188/72.4
[58] Field of Search .......................... 92/168; 74/18.2; 277/212 FB, DIG. 4; 188/72.4, 72.5

[56] References Cited

U.S. PATENT DOCUMENTS

| | | | |
|---|---|---|---|
| 3,322,445 | 5/1967 | Hassan | 277/212 FB |
| 3,430,995 | 3/1969 | Herbenar et al. | 277/212 FB |
| 3,490,343 | 1/1970 | Afanador et al. | 92/168 |
| 3,535,896 | 10/1970 | Kateb | 74/18.2 |
| 3,651,896 | 3/1972 | Fannin | 188/72.6 |
| 3,712,422 | 1/1973 | Haraikawa et al. | 188/72.5 |
| 3,801,111 | 4/1974 | Messenger | 277/58 |
| 3,998,466 | 12/1976 | Kando | 74/18.2 |
| 4,003,666 | 1/1977 | Gaines | 277/212 FB |
| 4,199,159 | 4/1980 | Evans | 277/212 FB |

Primary Examiner—Paul E. Maslousky
Attorney, Agent, or Firm—Schovee & Boston

[57] ABSTRACT

A non-convoluted, elongated sealing boot of elastomeric material in, or for use in, a cylinder and piston assembly of a disc brake of a vehicle brake system as a dirt seal to protect the piston and the cylinder chamber from road dirt and to prevent water entry. The sealing boot includes an elongated, molded elastomer sleeve which comprises seven distinct interacting segments, or wall portions, of a plurality of different and tapering thicknesses which permit the sleeve, when installed in a disc brake assembly, to be collapsed to a convoluted shape upon retracting the piston into the cylinder to replace the brake pads of the disc brake assembly.

15 Claims, 4 Drawing Figures

DISC BRAKE BOOT

This is a continuation of application Ser. No. 875,765, filed Feb. 7, 1978, now abandoned.

BACKGROUND OF THE INVENTION

This invention relates to a flexible elastomeric sealing boot, for use in the annular space between a piston and cylinder of a disc brake assembly to protect the piston and cylinder chamber from contamination by dirt and water.

Disc brake boots, or dirt seals, are known and used in the automotive field. However, the known type of elastomeric rubber boot which is generally used is a boot having a uniformly thin flexible wall which is molded in an accordion-pleated, or bellows, collapsed form and then during operation is stretched into an elongated form for use in a dirt boot assembly with one end being retained in a recess of the cylinder bore wall and the other end being retained in a piston groove. In the interest of space and weight economy, the piston-to-recess annular space must be kept as narrow as possible. For example, the piston diameter may be 45 mm in outer diameter and the cylinder recess for retaining the boot, may be 58.3 mm in diameter. Also, the boot must be capable of extending approximately 30 mm and collapsing to an overall height of about 11.5 mm when the piston is retracted to change the brake pads. The resulting narrowness of the annular space between the retaining wall of the recess and the piston makes it very difficult to mold a boot of bellows configuration with its accordion-like convolutions having sharp bends. The convolutions are required to permit the conventional boot to flex and roll into the annular space upon retracting the piston. The sharp bends in the bellows wall of the prior art boot cause the boot to operate in an uneven, jerky manner during retraction and extension. A conventional type of convoluted boot having a bellows type sleeve is taught, for example, by Kondo, U.S. Pat. No. 3,998,466, issued Dec. 21, 1976.

SUMMARY OF THE INVENTION

An improved sealing boot for use in the annular space between a cylinder and a piston of a disc brake assembly is provided by the present invention by molding onto an annular metal reinforcing shell, an integral, one-piece elongated, flexible, elastomeric sealing boot having a sleeve of a non-convoluted shape comprising a plurality of distinct portions having a plurality of different wall thicknesses. Preferably, seven distinct sleeve portions are used, which cooperate to permit the sealing boot, when installed in a disc brake assembly, to be flexed into a convoluted shape fitting into the annular space between the recess and the piston wall, upon retraction of the piston into the cylinder in the brake assembly, when the piston is retracted to replace the disc brake pads. The elongated, non-convoluted shape of the sleeve is advantageous for molding as compared to the uniformly thin convoluted shape of the conventional bellows type sleeve which is difficult to mold. Further, the sealing boot of this invention is at least as effective as the prior art seal for sealing the piston from dirt and water in a known way. Furthermore, the novel seaing boot of this invention provides a smoothly retracting and expanding flexible sleeve portion in which the various thicknesses of the various wall portions enhance the flexing and rolling of the boot as it is retracted to a convoluted shape and expanded to its elongated shape.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENT

Figure 1:
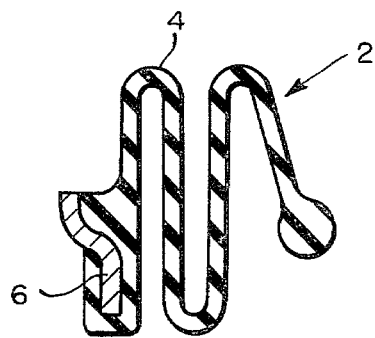
FIG. 1 is a partial, cross-sectional view of a disc brake sealing boot of the prior art.

Referring now to FIG. 1 of the drawing, it will be seen that the prior art sealing boot 2 comprises a thin-walled bellows type convoluted elastomeric sleeve 4 which has been molded in convoluted form on a metal reinforcing shell 6. In use, the flexible bellows expands and the elastomer of the bellows remains under tension during operation of the piston.

Figure 2:
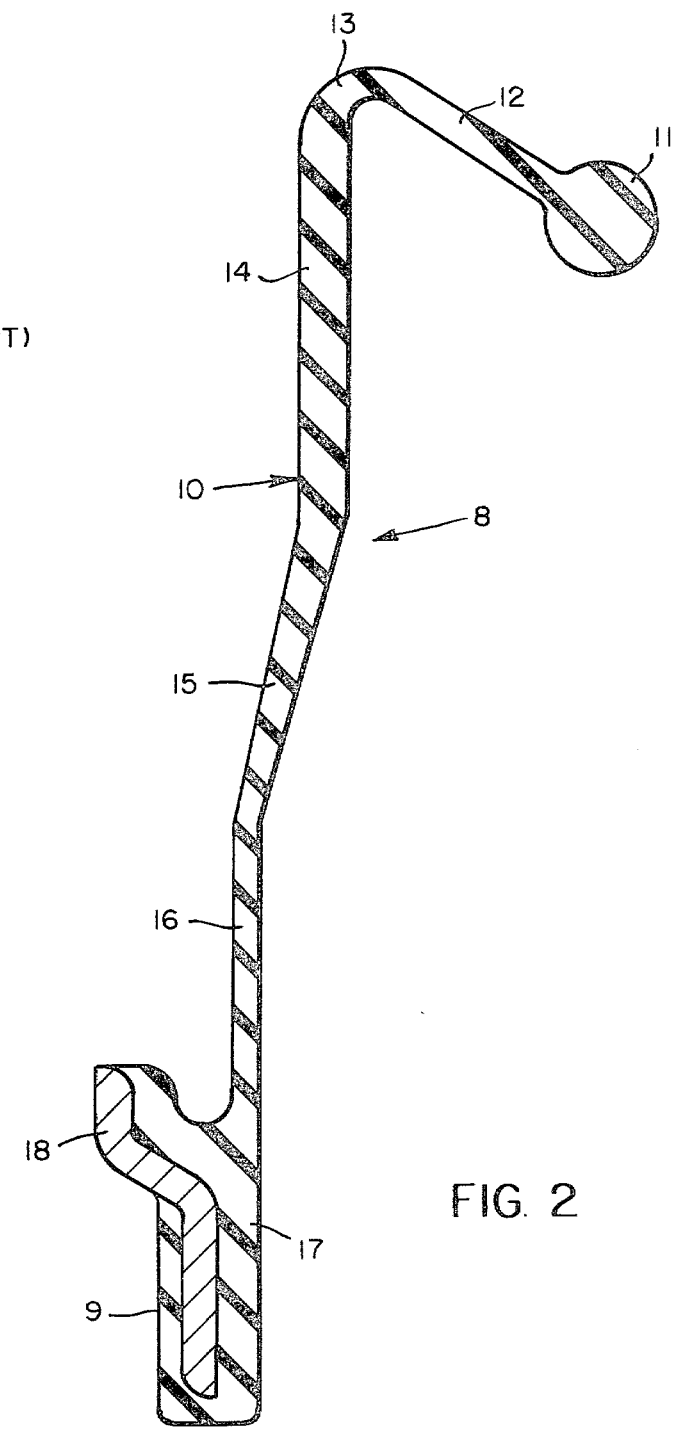
FIG. 2 is a partial, cross-sectional view of a disc brake sealing boot according to the present invention.
Figure 3:
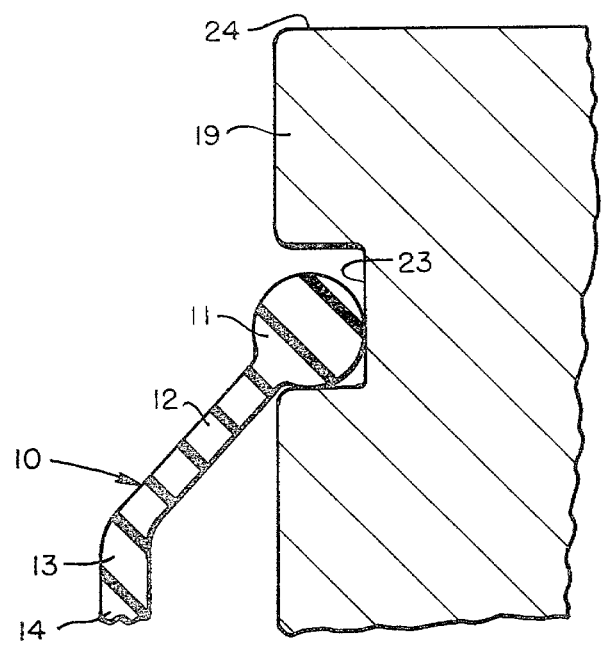
FIG. 3 is a fragmentary cross-sectional view of a piston of a disc brake with one end of the sealing boot of the present invention in extended position and retained in a recess of the piston.
Figure 4:
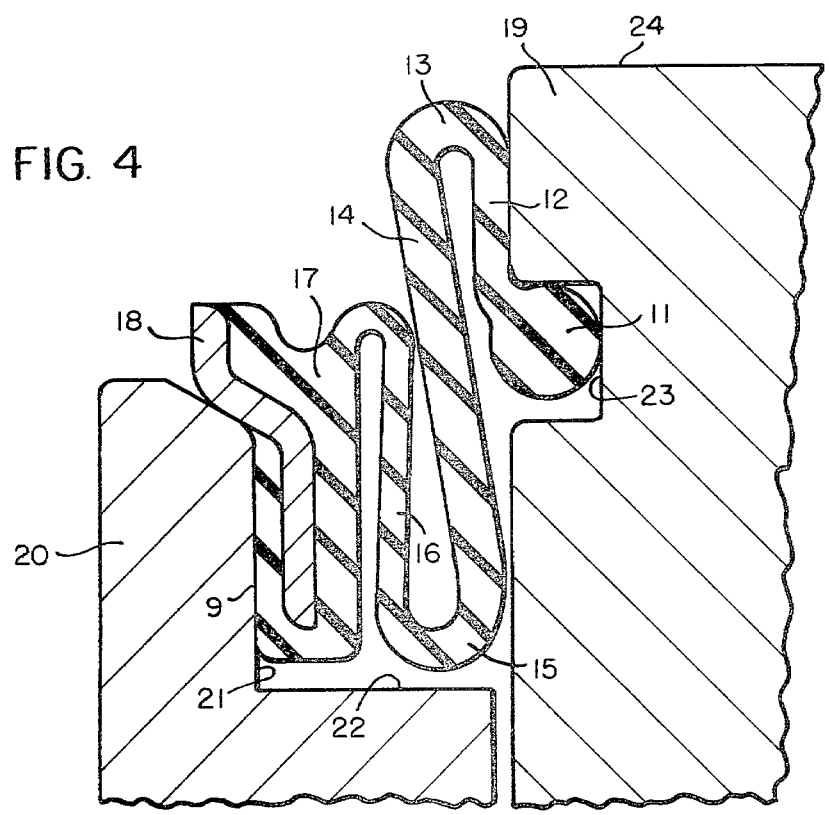
FIG. 4 is a partial, cross-sectional fragmentary view of a piston, cylinder and the sealing boot of the present invention showing the sealing boot in collapsed convoluted position with the piston in retracted position in the cylinder.

Reference is now made to FIGS. 2, 3, and 4 of the drawings which show a disc brake sealing boot 8 according to the present invention. The sealing boot 8 comprises an integral, one-piece, molded, elongated, flexible elastomeric sleeve 10 and an annular metal reinforcing shell 18 to which the elastomeric sleeve 10 is bonded. The sealing boot 8 is formed as a single unit having an outer cylindrical surface 9 adapted to friction fit into a recess 21 in a bore wall of a cylinder 20 adjacent to a piston 19, as shown in FIG. 4.

The elastomeric sleeve 10 comprises seven distinct portions which cooperate to seal the space between the piston 19 and the cylinder 20 to prevent dirt and water from entering into the sliding area of the piston. The seven portions of the sleeve especially cooperate to permit the expanded sleeve to flex and roll and to be collapsed into a convoluted shape which fits into an annular space 22 between the piston 19 and the recess 21.

The seven portions of the elastomeric sleeve are best illustrated in FIG. 2. The elastomer of which the seal is made can be any type of elastomer which is flexible at least under the extremes of temperature conditions to which the disc brake assembly is to be used. The elastomer should also be compatible with brake fluids, road salts, water and other expected contaminants. In general, any of the elastomers used to make the conventional bellows type of seal of the prior art e.g. rubber and synthetic elastomers can be used to form the boot of the present invention by known methods of forming, such as injection or compression molding.

Referring to FIG. 2, the elastomeric sleeve 10 includes as a first portion thereof, a sealing bead portion 11 at a piston sealing end of the sleeve. The bead portion 11 is adapted to elastically fit into an annular groove 23 in the periphery of the wall of the piston 19, adjacent to an axially extending outer endwall 24 of the piston. The bead portion 11 has an inner diameter of sufficiently lesser size than the outer diameter of the piston to permit the bead to be elastically stretched to fit it into the recess 23 and to form a seal therewith. The elastomeric sleeve 10 includes as a second portion thereof, an upper boot wall portion 12 which is of substantially uniform wall thickness and has a bead-adjoining end molded integrally to extending radially outwardly from the bead portion 11 at an inclined angle to the plane of the bead portion. The wall portion 12 has a radially outermost end molded integrally to an upper end of a third portion of said sleeve 10, which is an upper flex wall portion 13. The upper flex wall portion 13 has a lower end molded integrally with an upper end of a fourth portion of said sleeve 10, which is a stabilizing wall portion 14.

The stabilizing wall portion 14 has a substantially uniformly thick wall of a thickness greater than the wall thickness of the upper boot wall portion 12, and has a length greater than the length of said upper boot wall portion 12. The upper flex wall portion 13 has a wall thickness thinner than that of either the upper boot wall portion 12 or the stabilizing wall portion 14. The stabilzing wall portion 14 has an inner wall diameter greater than the outer diameter of the piston 19, but lesser than that of the cylinder-sealing end portion 17 to be discussed more fully below. The wall of wall portion 14 extends axially parallel to the cylindrical wall of the metal shell 18 to which the sleeve 10 is bonded.

The upper boot wall portion 12 has its wall positioned at an acute inclined angle relative to the wall of the wall portion 14. The upper flex wall portion 13 is curved and forms a connecting wall between the adjacent ends of the wall portions 12 and 14.

The elastomeric sleeve 10 includes as a fifth portion thereof an outwardly tapered frustoconical rolling wall portion 15 having an upper end integrally molded to the lower end of said wall portion 14 and having a lower end integrally molded to a sixth portion of said sleeve 10, which is a lower flex end rolling wall portion 16. The wall portion 16 has an inner diameter which is greater in size than the inner diameter of stabilizing wall portion 14 and has a substantially uniformly thick wall which is of a thickness which is lesser than the wall thickness of wall portion 14. The frustoconical rolling wall portion 15 has a length which is about equal to or less than that of said stabilizing wall portion 14, and said rolling wall portion 16 has a wall length which is less than that of the frustoconical rolling wall 15. The rolling wall portion 16 has a lower end integrally molded to an upper end of the seventh portion of said elastomeric sleeve 10, which is a cylinder-sealing end portion.

The inner diameters of wall portion 16 and that of the cylinder-sealing end portion 17 are sufficiently greater than the diameter of the piston 19 to form an annular space adequate to accommodate the stabilizing wall portion 14 and the wall portion 15 in a flexed convoluted position when the sealing boot 8 is installed in a disc brake assembly and the piston 19 is retracted into the cylinder 20, as is done when disc brake pads are to be installed or replaced.

FIG. 4 illustrates the manner in which the elastomeric sleeve 10 rolls and flexes at wall portion 13 and at the adjoined ends of wall portions 14 and 15, wall portions 15 and 16 and wall portion 16 and cylinder-sealing end portion 17, respectively when the piston 19 is retracted into cylinder 20. When the piston 1a is permitted to reach a fully-extended position, the sealing bead portion 11 of the seal assumes the position shown in FIG. 3, with the bead in the groove 23 and with wall portion 12 extended radially outwardly with wall portion 13 flexed from an acute angle position as shown in FIGS. 2 and 4 to an obtuse angle position as shown in FIG. 3.

During retraction of the piston, the functions of the various portions of the elastomeric sleeve are about as follows:

The upper boot wall portion 12 exerts a downward and outward force on the upper flex wall portion 13. This force is resisted by the stabilizing wall portion 14, causing the sealing bead portion 11 to roll in groove 23, thus permitting the upper boot wall portion 12 to invert itself to a postion as shown in FIG. 4. In a like manner, the tapered frustoconical rolling wall portion 15 exerts a downward and outward force on the lower flex and rolling wall portion 16 which then deflects outwardly, allowing the wall portion 15 to fold and roll itself to a position as shown in FIG. 4. Finally, retraction of the piston causes the stablizing wall portion 14 to exert a downward force through the inverted wall portion 15 to the lower flex and rolling wall portion 16. This step in turn causes the wall portion 16 to roll and fold itself into the convoluted position shown n FIG. 4. The inverting steps of wall portions 12 and 15 are independent and may occur simultaneously or in either order.

As will be understood by those skilled in the art, the sealing boot will move gradually from the configuration of FIG. 4 to that of FIG. 3 as the brake disk pads are worn. Then, upon replacement of the worn pads, the sealing boot will be returned to the configuration of FIG. 4 to repeat the cycle.

The invention has been described in detail with particular reference to the preferred embodiment thereof, but it will be understood that variations and modifications can be effected within the spirit and scope of the invention as described hereinabove and as defined in the appended claims.

We claim:

1. A flexible elongated sealing boot for sealing an annular space between a wall of a cylinder defining a bore and a relatively axially movable piston in the bore, said sealing boot comprising an annular, molded, one-piece, elastomeric sleeve that is collapsible from an extended as-molded condition to a collapsed, convoluted condition, said sleeve having a sealing bead portion at one end thereof and a cylinder sealing portion at the other end thereof, said bead portion having a smaller as-molded inner diameter than that of said cylinder sealing portion, said sleeve comprising seven distinct wall portions of a plurality of different thicknesses serially connected together and comprising in order from said bead portion: said sealing bead portion, an upper boot wall, an upper flex wall, a stabilizing wall, an outwardly tapered frusto-conical rolling wall, a lower flex and rolling wall, and said cylinder sealing portion, said sealing bead and said upper boot wall being located in the as-molded shape of said sleeve radially inwardly from said stabilizing wall and being connected thereto by said upper flex wall, and said lower flex and rolling wall and said cylinder sealing portion being located in the as-molded shape of said sleeve radially outwardly from said stabilizing wall and being joined thereto by said outwardly tapered frusto-conical rolling wall.

2. A sealing boot according to claim 1 wherein said upper boot wall is molded to form an acute angle with said stabilizing wall.

3. A sealing boot according to claim 2 wherein said cylinder sealing portion has an outer cylindrical surface and wherein said stabilizing wall is cylindrical and is of a substantially uniform thickness.

4. A sealing boot according to claim 3 wherein said upper boot wall is of a substantially uniform wall thickness of lesser thickness than said stabilizing wall, and wherein said upper flex wall is a curved connecting wall between said upper boot wall and said stabilizing wall.

5. A sealing boot according to claim 4 wherein said lower flex and rolling wall has an inner diameter greater than the inner diameter of said stabilizing wall portion, and wherein said lower flex and rolling wall has a substantially uniform thickness which is smaller than that of said stabilizing wall, and wherein said frusto-conical wall has a length less than that of said stabilizing wall.

6. A sealing boot according to claim 5 wherein the inner diameter of said lower flex and rolling wall and of said cylinder sealing end are substantially identical.

7. A sealing boot according to claim 1 wherein said cylinder sealing portion includes an annular metal shell and an annular elastomeric layer thereon.

8. An apparatus comprising a cylinder having a bore therein defined by a bore wall a piston located in said cylinder bore for relative axial movement with respect to said cylinder bore, and a flexible elongated sealing boot for sealing an annular space between said bore wall and said piston, said sealing boot comprising an annular, molded, one-piece, elastomeric sleeve that is collapsible from an extended, as-molded condition to a collapsed, convoluted, condition when said piston retracts into said cylinder, said piston having an annular groove and said sleeve having a sealing bead portion at one end thereof elastically seated in said groove, said cylinder having a recess in said bore wall and said sleeve havng a cylinder sealing portion at the other end thereof seated in said recess, said sleeve comprising seven distinct wall portions of a plurality of different thicknesses serially connected together and comprising in order from said bead portion: said sealing bead, an upper boot wall, an upper flex wall, a stabilzing wall, an outwardly tapered frusto-conical rolling wall, a lower flex and rolling wall, and said cylinder sealing portion, said sealing bead and said upper boot wall being located in the as-molded shape of said sleeve radially inwardly from said stabilizing wall and being connected thereto by said upper flex wall, and said lower flex and rolling wall and said cylinder sealing portion being located in the as-molded shape of said sleeve radially outwardly from said stabilizing wall and being joined thereto by said outwardly tapered frusto-conical rolling wall.

9. An apparatus according to claim 8 wherein said upper boot wall is molded to form an acute angle with said stabilizing wall.

10. An apparatus according to claim 8 wherein said cylinder sealing portion has an outer cylindrical surface in sealing contact with said recess and wherein said stabilizing wall is cylindrical and is of a substantially uniform thickness.

11. An apparatus according to claim 8 wherein said upper boot wall is of a substantially uniform wall thickness of lesser thickness than said stabilizing wall, and wherein said upper flex wall is a curved connecting wall between said upper boot wall and said stabilizing wall.

12. An apparatus according to claim 8 wherein said lower flex and rolling wall has an inner diameter greater than the inner diameter of said stabilizing wall portion, and wherein said lower flex and rolling wall has a substantially uniform thickness which is smaller than that of said stabilizing wall, and wherein said frusto-conical wall has a length less than that of said stabilizing wall.

13. An apparatus according to claim 8 wherein the inner diameter of said lower flex and rolling wall and of said cylinder sealing portion are substantially identical.

14. An apparatus according to claim 8 wherein said cylinder sealing portion includes an annular metal shell and an annular elastomeric layer thereon.

15. An apparatus according to claim 8 wherein said recess has an inner diameter sufficiently greater than the outside diameter of said piston to accommodate, in an annular space between said recess and said piston, said sealing boot when in its collapsed convoluted condition.

* * * * *